United States Patent
Cottingham

(10) Patent No.: US 8,944,446 B1
(45) Date of Patent: Feb. 3, 2015

(54) SWIVEL DRIVE SYSTEM

(71) Applicant: Brent R. Cottingham, Grand Rapids, MI (US)

(72) Inventor: Brent R. Cottingham, Grand Rapids, MI (US)

(*) Notice: Subject to any disclaimer, the term of this patent is extended or adjusted under 35 U.S.C. 154(b) by 0 days.

(21) Appl. No.: 13/912,949

(22) Filed: Jun. 7, 2013

Related U.S. Application Data

(60) Provisional application No. 61/657,296, filed on Jun. 8, 2012.

(51) Int. Cl.
*B60B 19/12* (2006.01)
*B60B 19/00* (2006.01)
*B62D 61/10* (2006.01)

(52) U.S. Cl.
CPC .............. *B60B 19/003* (2013.01); *B62D 61/10* (2013.01)
USPC ........ 280/86; 280/81.1; 180/65.51; 180/65.6; 180/252; 301/5.23

(58) Field of Classification Search
USPC ............. 280/81, 86, 47.27, 43.12; 180/65.51, 180/65.6, 252, 253, 22, 23, 24, 24.06, 180/24.07, 24.08; 301/5.23
See application file for complete search history.

(56) References Cited

U.S. PATENT DOCUMENTS

| | | | | |
|---|---|---|---|---|
| 3,876,255 | A | | 4/1975 | Ilon |
| 4,221,273 | A | * | 9/1980 | Finden .................. 180/6.48 |
| 4,463,821 | A | * | 8/1984 | Falamak ................. 180/168 |
| 4,683,973 | A | * | 8/1987 | Honjo et al. ............. 180/252 |
| 4,778,024 | A | * | 10/1988 | Matsumoto et al. ........ 180/167 |
| 4,981,203 | A | * | 1/1991 | Kornylak ............... 193/35 MD |
| 5,649,605 | A | * | 7/1997 | Ronne et al. ............. 180/23 |
| 5,950,749 | A | * | 9/1999 | Inoue ................... 180/7.1 |
| 6,408,230 | B2 | * | 6/2002 | Wada .................... 701/1 |
| 6,491,127 | B1 | * | 12/2002 | Holmberg et al. ......... 180/252 |
| 6,810,976 | B2 | * | 11/2004 | Rohrs ................... 180/22 |
| 6,948,576 | B2 | * | 9/2005 | Angeles ................. 180/23 |
| 2005/0212243 | A1 | * | 9/2005 | Terry ................... 280/79.11 |
| 2010/0181136 | A1 | * | 7/2010 | Swasey et al. ........... 180/253 |
| 2011/0094805 | A1 | * | 4/2011 | Hammonds ............... 180/6.48 |
| 2012/0111648 | A1 | * | 5/2012 | Terashima et al. ........ 180/6.2 |

* cited by examiner

*Primary Examiner* — Ruth Ilan
*Assistant Examiner* — Darlene P Condra
(74) *Attorney, Agent, or Firm* — Gardner, Linn, Burkhart & Flory, LLP

(57) ABSTRACT

A swivel drive system, such as for providing a driving force for a vehicle, comprises multiple drive modules, with each drive module including a plurality of wheel assemblies mounted for rotation relative to an axis of the drive module, with each wheel assembly being separately rotatable relative to a respective axis of the wheel assembly. Simultaneous rotation of the wheel assemblies relative to the axis of the drive module and rotation of each wheel assembly about its own axis generates a driving force for the vehicle.

20 Claims, 6 Drawing Sheets

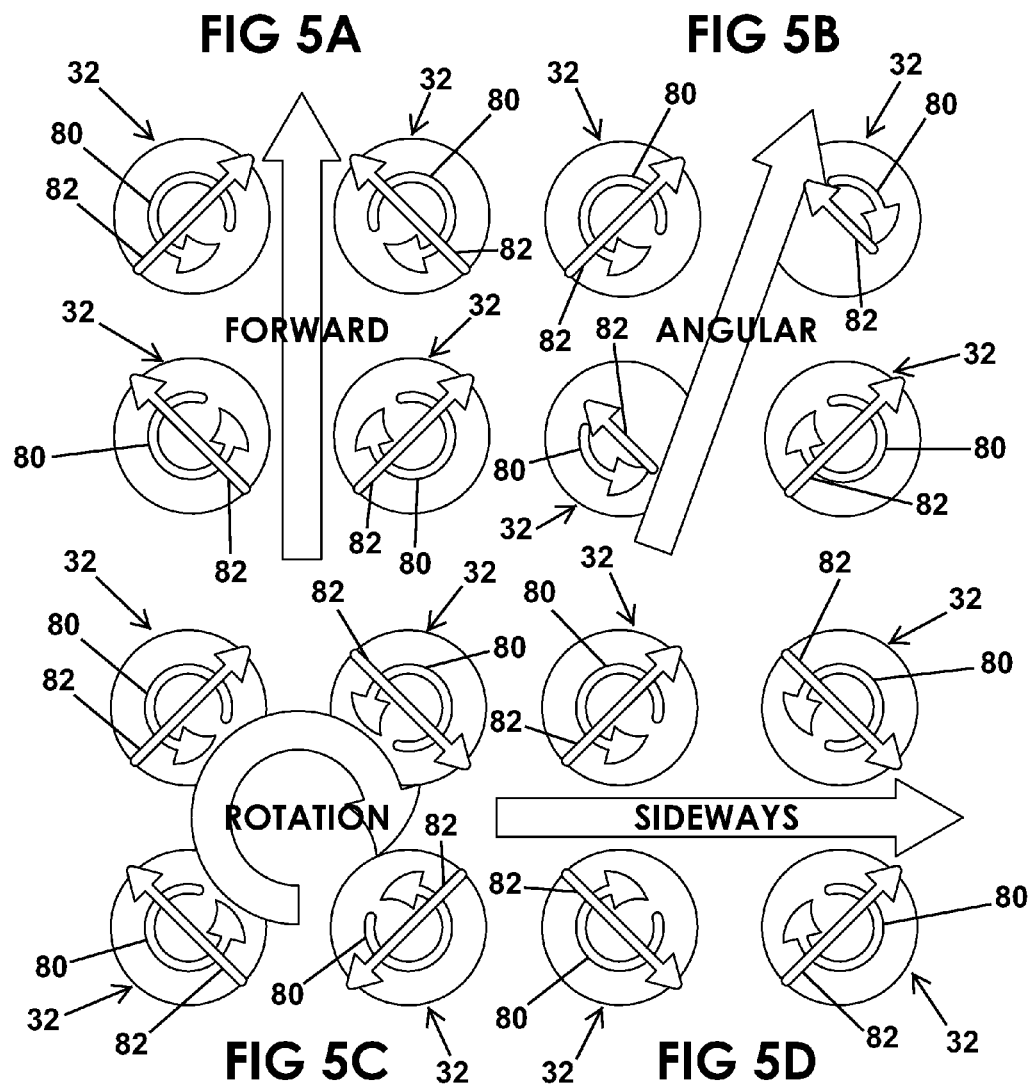

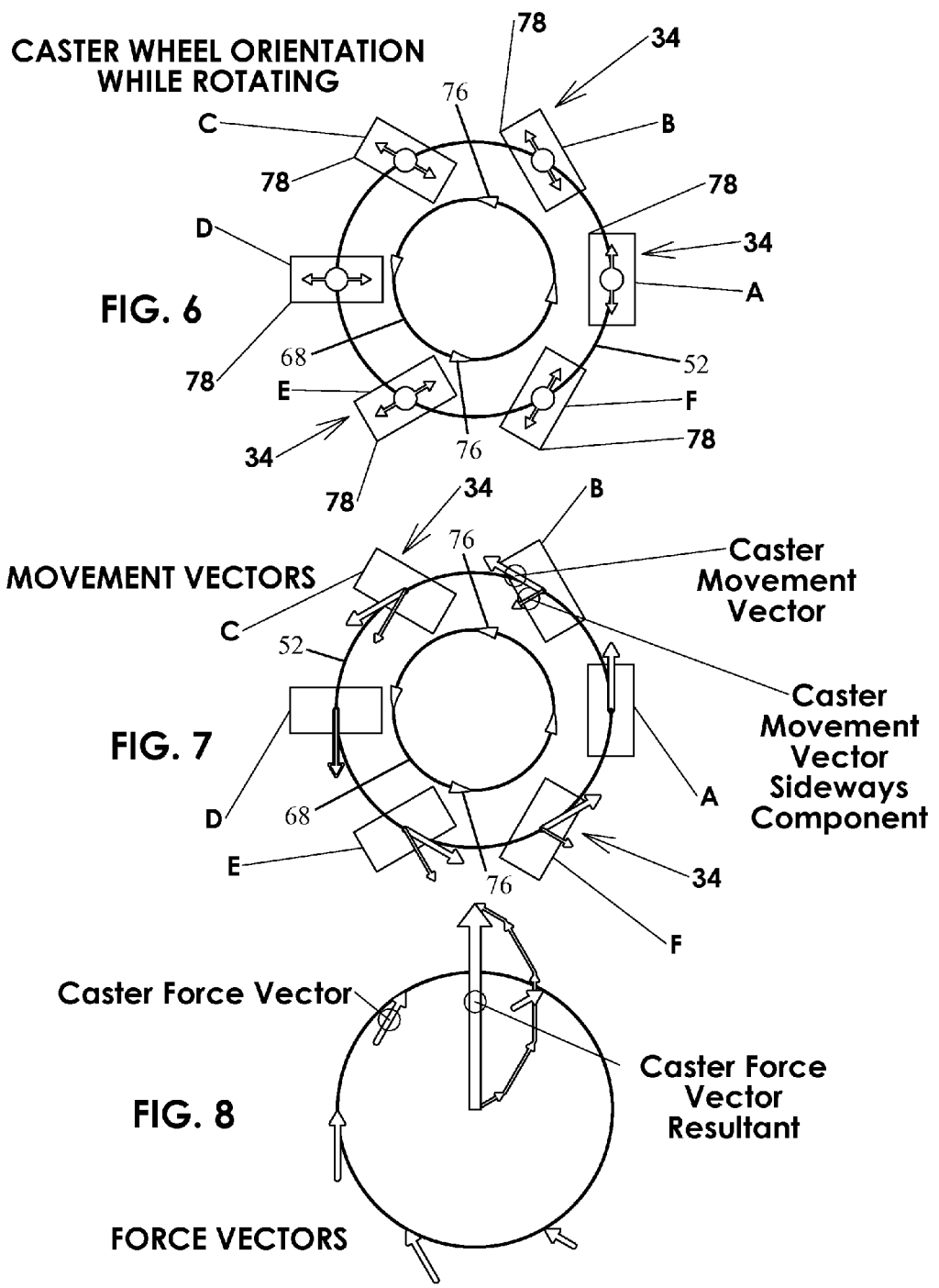

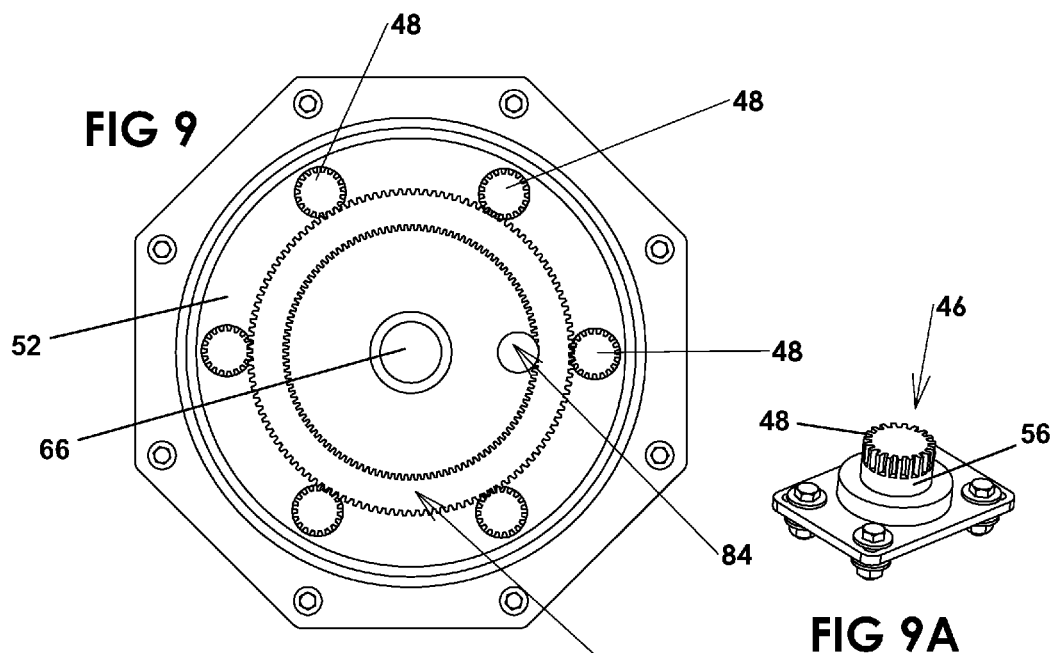
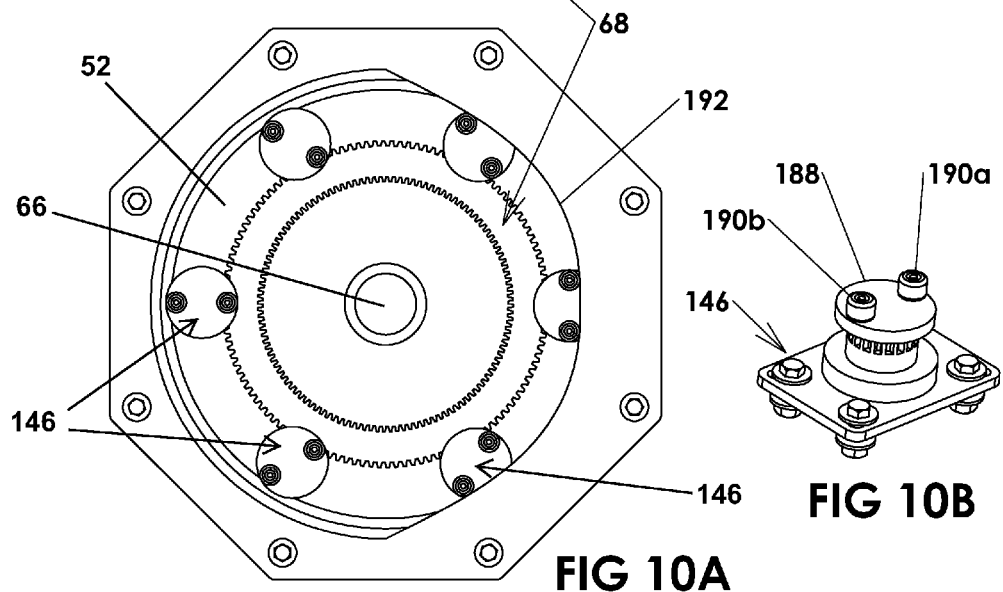

US 8,944,446 B1

SWIVEL DRIVE SYSTEM

CROSS REFERENCE TO RELATED APPLICATION

The present application claims priority of U.S. provisional application, Ser. No. 61/657,296 filed Jun. 8, 2012, by Brent Cottingham, which is hereby incorporated herein by reference in its entirety.

BACKGROUND OF THE INVENTION

The present invention is directed to a drive system, and in particular a swivel drive system and vehicles employing such a swivel drive system.

Conventional drive systems provide motive force in directions collinear with the rolling orientation of wheels or tracks associated with the drive system. Such systems are employed on numerous forms of vehicles, including industrial equipment. In such systems the vehicle will typically have a front, back and side orientations, where movement is limited to proceeding in directions corresponding to the front and/or back of the vehicle. The vehicles, therefore, must be aligned in the direction in which travel is desired, which can pose difficulties for operating in constricted settings.

SUMMARY OF THE INVENTION

The present invention provides a swivel drive system for vehicles enabling the vehicle to move in any direction.

According to an aspect of the present invention, a swivel drive system comprises a drive module having a plurality of wheel assemblies mounted for rotation relative to an axis of the drive module, with each wheel assembly being separately rotatable relative to a respective axis of the wheel assembly. Simultaneous rotation of the wheel assemblies relative to the axis of the drive module and rotation of each wheel assembly about its own axis generates a driving force.

The wheel assemblies include a rotatable wheel, with the rolling orientation of the wheel being altered by rotation of each wheel assembly about its own axis. The wheel assemblies may be mounted to a rotatable carrier, wherein rotation of the carrier causes the wheel assemblies to rotate about the axis of the drive module. Each wheel assembly may also include a geared portion that engages with a synchronizing member whereby movement of the synchronizing member simultaneously rotates the wheel assemblies about its own axis. In certain embodiments each wheel assembly may be caused to rotate about its own axis at one-half the rate of rotation of the wheel assemblies about the axis of the drive module.

The swivel drive system may include multiple drive modules, including four drive modules connected to a vehicle. The drive modules are separately operable whereby the rotation of the wheel assemblies of each drive module may be adjusted to control the speed and direction of travel. A drive control system, such as including one or more joysticks, may be used by an operator to control the relative direction and speed of rotation of the wheel assemblies of each drive module.

Vehicles equipped with the swivel drive system of the present invention are able to travel in any direction along a surface, including sideways relative to a conventional front and back of the vehicle, such as with respect to a seating orientation of an operator of the vehicle. Vehicles so equipped are thereby well adapted to operate in confined locations, such as within aisle ways of facilities.

These and other objects, advantages, purposes and features of this invention will become apparent upon review of the following specification in conjunction with the drawings.

BRIEF DESCRIPTION OF THE DRAWINGS

FIGS. 5A-5D schematically illustrate selected driving directions of the vehicle of FIG. 1 obtainable via various alternative rotational formats of the four swivel drive modules;

FIG. 6 is a schematic illustration of the wheel assembly position as the module is rotated;

FIG. 7 is a schematic illustration of the movement vectors associated with the wheel assembly positions and rotation depicted in FIG. 6;

FIG. 8 is a schematic illustration of the force vectors associated with the wheel assembly positions and rotation depicted in FIG. 6;

FIG. 9 is a partial top plan view of the swivel drive module of FIG. 2 shown with a portion of the housing removed for clarity;

FIG. 9A is a perspective view of a wheel gear of a wheel assembly of the swivel drive module of FIG. 9;

FIG. 10A is an alternative swivel drive module in accordance with another aspect of the present invention; and FIG. 10B is a perspective view of the wheel gear of a wheel assembly of the swivel drive module of FIG. 10A.

DESCRIPTION OF THE PREFERRED EMBODIMENTS

Figure 1:
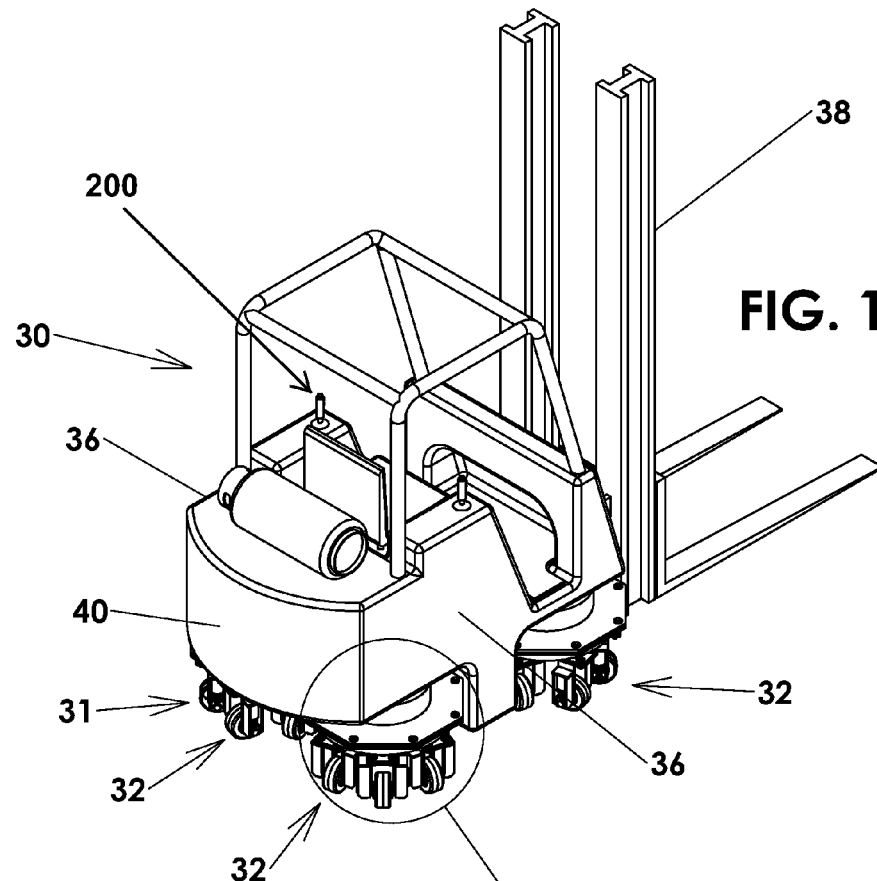
FIG. 1 is a perspective view of a vehicle equipped with four swivel drive modules in accordance with an aspect of the present invention.
Figure 1A:
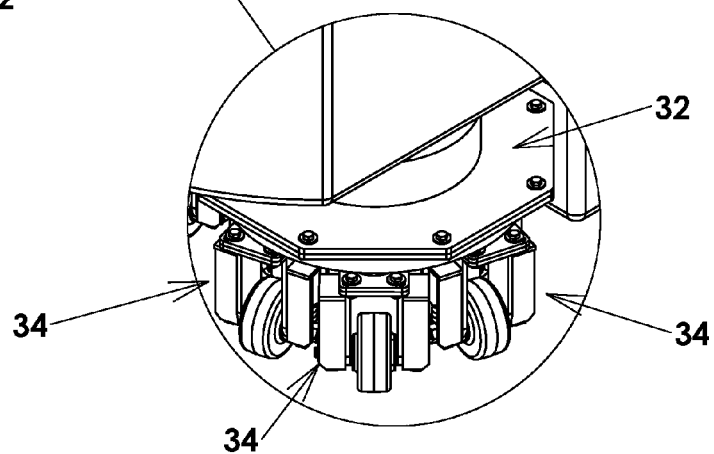
FIG. 1A is a close up perspective view of one of the swivel drive modules mounted to the vehicle of FIG. 1.

The present invention will now be described with reference to the accompanying figures, wherein the numbered elements in the following written description correspond to like-numbered elements in the figures. Mobile vehicle 30, disclosed as a forklift in FIG. 1, includes a swivel drive system 31 having multiple swivel drive modules 32 in accordance with an embodiment of the present invention that provide motive force to forklift 30. Forklift 30 includes four such modules 32 disposed at corner areas of forklift 30, with each module 32 being affixed for rotation relative to forklift 30 as understood from FIG. 1A. Each swivel drive module 32 includes multiple wheel assemblies 34, with the wheel assemblies 34 being collectively rotatable about an axis of the module 32 when the module 32 is rotated, as affixed to forklift 30, and with each wheel assembly 34 being separately rotatable relative to the module 32 itself. As discussed in detail below, forklift 30 may be driven in multiple directions based on the speed and direction of rotation of the modules 32 of forklift 30 relative to each other while the wheel assemblies 34 of the modules 32 are being simultaneously rotated relative to the modules 32. In contrast to conventional forklifts, for example, forklift 30 may be driven sideways, as well as in other directions without the necessity of forklift 30 having to rotate. Thus, forklift 30 may be driven in the direction of its sides 36, as well as in the direction of its front 38 and back 40, as well as at angles relative thereto or may even rotate based on the speed and direction of rotation of modules 32 relative to each other and corresponding relative rotation wheel assemblies 34.

Figure 3:
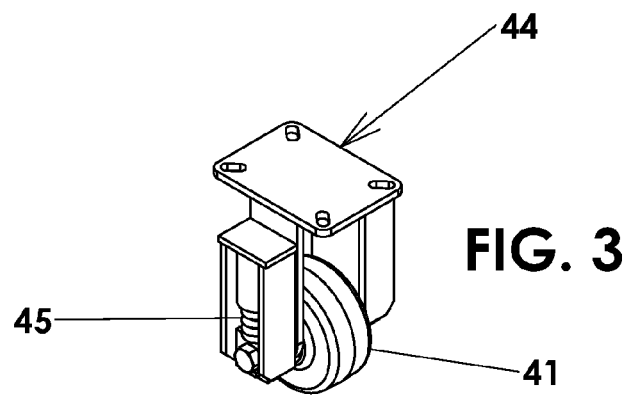
FIG. 3 is a perspective view of a caster from a wheel assembly of the swivel drive module of FIG. 2.
Figure 2:
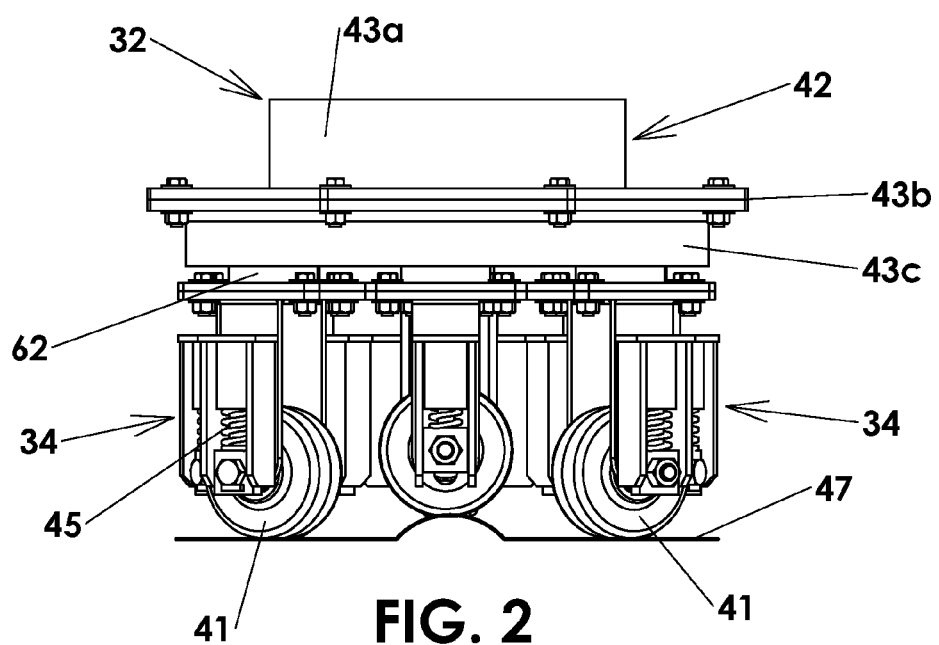
FIG. 2 is a side elevation view of a swivel drive module in accordance with an aspect of the present invention.
Figure 4:
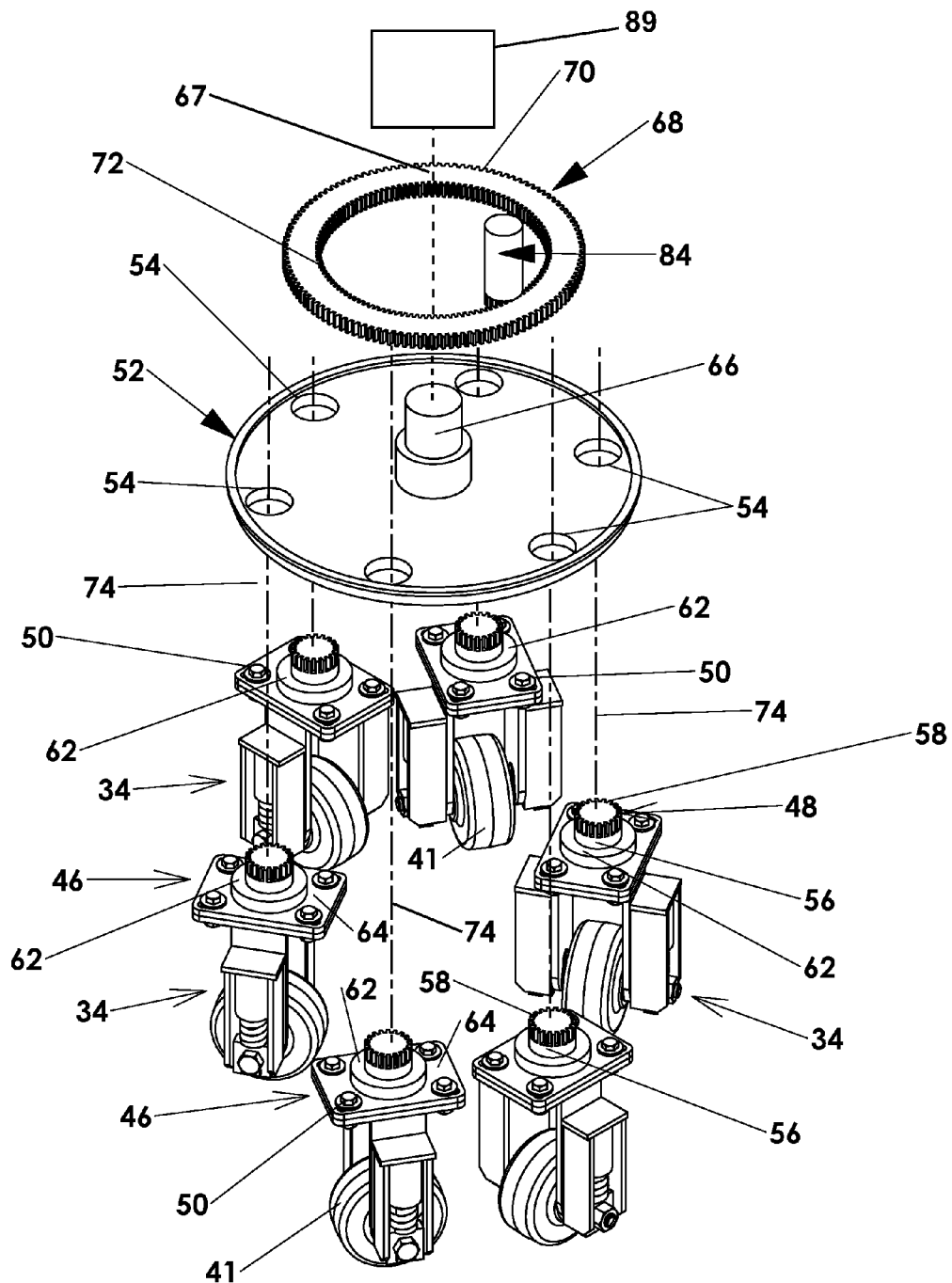
FIG. 4 is a partial exploded perspective view of components of the swivel drive module of FIG. 2.

Referring now to the embodiment shown in FIGS. 2-4, each module 32 includes six wheel assemblies 34 joined with housing 42, with wheel assemblies 34 incorporating conventional sprung casters 44 (FIG. 3) that are circumferentially disposed about housing 42. In the case of sprung casters 44, wheels 41 of casters 44 are mounted via springs 45 to axles between legs whereby each wheel assembly 34 is able to absorb or accommodate deviations in the surface 47 over which forklift 30 travels (FIG. 2). Accordingly, all of the wheel assemblies 34 may remain in substantial contact with the surface 47. Although modules 32 are shown to include six wheel assemblies, it should be appreciated that modules having an alternative number of wheel assemblies may be employed, such as having two or more wheel assemblies, including more than six wheel assemblies. Still further, alternative casters may be employed as well, such as non-sprung casters, as well as wheel assemblies with solid or pneumatic wheels.

As understood from FIG. 4, each wheel assembly 34 further includes a wheel gear assembly 46 affixed to a sprung caster 44, with the wheel gear 46 including a wheel gear hub 48 projecting upwardly from the caster 44 when wheel gear 46 is connected to caster 44, such as by threaded fasteners 50. A caster carrier 52 is contained within housing 42 and includes apertures 54 through which wheel gear hubs 48 project when gear hubs 48 are mounted into housing 42. In the illustrated embodiment, housing 42 includes an upper housing member 43a and a pair of lower housing members 43b, 43c, with the various housing members being joined together to form a hollow interior region within which carrier 52 is contained. Housing members 43a and 43b are fixedly connected together by fasteners, with lower housing member 43c in turn being connected to housing member 43b and including a bottom opening (not shown) through which wheel assemblies 34 may project. The opening in 43c may, for example, be sized to be just greater than carrier 52. The housings 42, in turn, are mounted to the vehicle 30.

Circumferential walls or lands 56 of gear hub 48 are positioned within apertures 54 of carrier 52 when wheel gears 46 are received therein with sufficient clearance provided whereby wheel assemblies 34 are able to rotate relative to carrier 52. When gear hubs 48 are positioned within apertures 54 the geared end 58 of hub 48 projects through carrier 52 such that the geared end 58 may engage and interact with a synchronizing member or positioning ring gear 68, as discussed in more detail below. Wheel assemblies 34 further include bearings or bearing surfaces 62 disposed about gear hubs 48. As understood from FIG. 2, when wheel assemblies 34 are mounted to housing 42 bearings 62 are sandwiched between lower housing member 43c and a plate portion 64 of wheel assemblies 34, with bearings 62 promoting the ability of wheel assemblies to rotate relative to housing member 43c.

Carrier 52 includes a carrier hub 66 that is driven for rotation about the upwardly extending axis 67 of hub 66, with hub 66 being connectable with forklift 30 for providing driving rotation of carrier 52, such as by way of motor 89. It should be understood that due to the connection of wheel assemblies 34 with lower housing member 43c, driving rotation of carrier 52 causes both lower housing member 43c and wheel assemblies 34 to rotate relative to housing members 43a and 43b.

In addition to the rotation of wheel assemblies 34 about the axis 67 of module 32 by rotation of carrier 52 such that wheel assemblies 34 rotate with carrier 52, wheel assemblies 34 are also able to rotate relative to carrier 52 as will now be discussed. As shown in FIGS. 4 and 9, a synchronizing member shown as a ring gear 68 is included with each module 32, with ring gear 68 including both outer gear teeth 70 and inner gear teeth 72. Ring gear 68 is disposed within housing 42 adjacent to carrier 52 such that outer gear teeth 70 engage the geared ends 58 of the various wheel assemblies 34 of the module 32. Movement of ring gear 62 about the axis 67 of hub 66 relative to carrier 52 thereby imparts synchronized rotational movement to wheel assemblies 34 about axes 74 relative to carrier 52. Moreover, the wheel assemblies 34 will all move in concert relative to carrier 52 due to the geared ends 58 of each wheel assembly 34 being in contact with ring gear teeth 70. It should also be appreciated that in the embodiment shown, the wheel assemblies 34 will also each rotate an equal amount based on the degree of rotation of ring gear 72 due to the geared ends 58 being of equal diameter and tooth size. Alternative synchronizing members may be utilized, such as a toothed belt or the like.

Due to wheel gears 46 being fixedly connected with casters 44, rotation of wheel gears 46 changes the angular orientation of wheels 41 relative to axis 67. For example, a given wheel assembly 34 may be rotated relative to carrier 52 such that the direction of rolling movement of the wheel assembly 34 is oriented radially outward relative to carrier 52 and axis 67, or may be rotated such that the direction of rolling movement is oriented to be generally tangential relative to carrier 52, or anywhere between such orientations. As discussed in more detail below, the rotation of wheel assemblies 34 relative to caster carrier 52 contributes to the driving force provided by modules 32.

As described above, wheel assemblies 34 for each module 32 are able to both rotate about axis 67 of the module 32, such as by rotation of carrier 52 to which wheel assemblies 34 are connected whereby the axis of rotation is about carrier hub 66. In addition, the wheel assemblies 34 are themselves able to rotate relative to carrier 52, and in particular rotate about axes 74 of wheel assemblies 34 as defined by the gear hub 48. As understood from FIGS. 6-8, this dual rotation provides the driving force for modules 32.

FIGS. 6 and 7 may be understood to depict either a single wheel assembly 34 in different positions A-F as it is rotated by carrier 52, or may alternatively be understood to depict the six wheel assemblies 34 of module 32 in their instantaneous orientations relative to carrier 52 as carrier 52 is rotated. As carrier 52 is rotated in a counterclockwise direction relative to the view of FIGS. 6 and 7, ring gear 68 is also correspondingly rotated counterclockwise, as depicted by the rotational arrows 76, but with ring gear 68 being rotated at half the rotational speed of carrier 52, as illustrated by the arrows in the representation of the wheel assembly 34 at position A in FIG. 6. Accordingly, when at position A, the rolling orientation of wheel assembly 34 will be aligned with the rotational turning direction of carrier 52, for example with movement vector or rolling orientation of the wheel 41 being tangentially aligned with the carrier 52. Upon subsequent rotation of carrier 52 and ring gear 60, the rolling orientation of wheel assembly 34 will become angularly oriented relative to carrier 52 through positions B and C, as also illustrated by the arrows, until the rolling orientation of wheel assembly 34 is radially oriented relative to carrier 52, as shown by the arrows in position D.

Continued rotation of carrier 52 and ring gear 68 causes the wheel assembly 34 to again move into a non-radial orientation relative to carrier 52 as shown at positions E and F. Still further, upon wheel assembly 34 returning to position A the rolling orientation would again be tangentially aligned relative to carrier 52. However, the wheel assembly 34 will have only rotated 180 degrees relative to carrier 52 during the 360 degree revolution of carrier 52. This is depicted by the marking of a common point 78 on wheel assembly 34 in positions A-F of FIGS. 6 and 7.

It should be understood that when at position D, rotation of carrier 52 will generate a sideways force relative to wheel assembly 34 without any vector component in the rolling orientation or direction to the wheel 41 of wheel assembly 34. Accordingly, at position D this sideways force generates the greatest force for providing motion to forklift 30. In contrast, when at position A the wheel assembly 34 is free to rotate with rotation of carrier 52 such that effectively no driving force is imparted. Driving forces are imparted as depicted in positions B, C, E and F, however, these forces are less than the force generated at position D and, furthermore, are angled relative to the force generated at position D. FIG. 8 depicts the summation of the driving force vectors that result by rotation of module 32, with the caster force resultant vector indicating that the system movement caused by rotating the wheel assemblies 34 is opposite the movement of the wheel assembly 34 of position D.

Although depicted in six positions in FIGS. 6 and 7 it should be understood that driving forces are generated via each wheel assembly 34 through substantially the entire rotation of wheel assembly 34 about module 32, with the force being minimal or effectively zero force when at position A and growing to a maximum at position D, and then again decreasing as the wheel assembly 34 rotates back to position A.

Referring now to FIGS. 5A-5D, selected driving directions of forklift 30 are depicted that are obtained based on the indicated relative rotation of modules 32. The internal circular arrows 80 within modules 32 indicate the direction of rotation of modules 32, in particular the rotation of carrier 52. Arrows 82 for each module depict the resulting force vector obtained from rotation of the module 32, with the subsequent vehicle movement being shown by the larger arrow. With regard to the angular movement of FIG. 5B, the shorter arrows 80 and 82 associated with the upper right and lower left modules 32 reflect a decreased relative magnitude compared to the other modules 32, thereby enabling angular driving. Increased or decreased driving forces from a module 32 may be obtained by rotating the module faster or slower, respectively, including relative to other modules 32. It should be appreciated that reversing the rotational direction of modules 32 from that shown in FIGS. 5A-5D would reverse the direction of vehicle movement from that depicted.

Various mechanisms may be employed to cause wheel assemblies 34 to rotate relative to carrier 52. For example, as depicted in FIGS. 4 and 9, a synchronizing input shown as timing input shaft 84 having a geared end 86 for engaging with the inner gear teeth 72 of ring gear 68 may be employed. Alternatively, as understood from FIGS. 10A and 10B, an alternative wheel gear 146 may be provided for the wheel assemblies, with the wheel gear 146 including a cam follower 188 mounted on top of the wheel gear hub 148, with the cam follower 188 including a pair of roller followers 190a, 190b. Correspondingly, a cam 192 is provided, such as affixed to a portion of module housing 42. Rotation of the carrier 52 will cause the roller followers 190a, 190b to be rotated into contact with cam 192, whereby cam 192 will impart the proper angular rotation to the wheel assemblies as they are rotated by carrier 52.

It should be appreciated that alternative methods and apparatuses may be utilized to control the rotation of wheel assemblies. For example, a belt, such as a toothed belt, may be employed in place of a ring gear. Still further, a motor may be connected to each wheel assembly, such as a hydraulic motor connected with the geared end 58 of hub 48, for individually controlling the rotation of the wheel assembly. In such an embodiment, the motor may be used to individually control the rotation of the wheel assemblies independently from one another, as opposed to synchronizing equal amounts of rotation for each wheel assembly in the embodiments discussed above, including both with regard to the orientation and rate of rotation. Such individual control of the wheel assemblies may be utilized to alter the force vectors generated by each wheel assembly.

Although shown in connection with a forklift 30, it should be appreciated that the swivel drive modules 32 may be employed with numerous other types of equipment, such as various construction or industrial equipment or robots, including towing equipment, equipment for lifting workers or other items, and the like. In addition, although vehicle 30 is illustrated to include four modules 32 mounted at the corners of the vehicle, it should be understood that vehicles with alternative numbers of modules and/or different mounting locations may be employed, including vehicles having two or more swivel drive modules. Still further, it should be appreciated that appropriate integrated controls may be utilized for controlling the directional movement of a vehicle 30. For example, vehicle 30 may be employed with an integrated drive control system 200, whereby the direction and amount of push on one or more joysticks controls the relative direction and speed of rotation of modules 32, such as by controlling the input speed and direction of rotation to the carrier hub 66 and/or shaft 84 of each of the respective modules 32 on vehicle 30. It should be appreciated that a vehicle having a swivel drive system in accordance with the present invention requires a minimum of a single wheel module in order to provide motive force. In order to emulate the motion of a conventional vehicle, that is providing longitudinal motion and turning motion or rotating in place, a minimum of two drive modules are required. Moreover, in order to enable uncoupled motion, that is motion irrespective of the orientation of the vehicle, a minimum of three wheel modules are required.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A swivel drive system, said swivel drive system comprising:
a pair of drive modules, each said drive module including
a plurality of wheel assemblies mounted for rotation relative to an axis of said drive module, with each said wheel assembly being separately rotatable relative to a respective axis of said wheel assembly;
wherein simultaneous rotation of said wheel assemblies relative to said axis of said drive module and rotation of each said wheel assembly about its own axis generates a driving force, and wherein said wheel assemblies are mounted to a rotatable carrier, wherein said carrier is driven for rotation about said axis of said drive module and wherein driven rotation of said carrier causes said wheel assemblies to rotate about the axis of said drive module, and wherein each said wheel assembly is rotated about its own axis at one-half the rate of rotation of said wheel assemblies about said axis of said drive module.

2. The swivel drive system of claim 1, wherein said drive module is arranged whereby all of said wheel assemblies remain substantially in contact with a supporting surface.

3. The swivel drive system of claim 1, wherein said wheel assemblies include a rotatable wheel, with the rolling orientation of said wheel being altered by said rotation of each said wheel assembly about its own axis.

4. The swivel drive system of claim 1, said drive module further including a synchronizing member engaged with said wheel assemblies whereby movement of said synchronizing member simultaneously rotates said wheel assemblies about the respective axis of each said wheel assembly.

5. The swivel drive system of claim 4, said drive module further including a synchronizing input, said synchronizing input engaging with said synchronizing member to impart rotation to said synchronizing member.

6. The swivel drive system of claim 4, wherein said wheel assemblies include a geared portion with said geared portions of said wheel assemblies being in engagement with said synchronizing member.

7. The swivel drive system of claim 6, wherein said synchronizing member comprises a ring gear.

8. The swivel drive system of claim 1, said drive module further including a cam member, and wherein each said wheel assembly includes a cam follower, with said cam followers being rotated into contact with said cam when said wheel assemblies are rotated relative to said axis of said drive module to rotate said wheel assemblies about the respective axis of each said wheel assembly.

9. The swivel drive system of claim 1, further including a plurality of said drive modules.

10. The swivel drive system of claim 9, wherein said drive modules are independently operable.

11. The swivel drive system of claim 9 further including a drive control system, said drive control system being operable by an operator to control the relative direction and speed of rotation of said wheel assemblies of each said drive module.

12. The swivel drive system of claim 1, wherein said axis of said drive module comprises a substantially vertical axis, and wherein said axis of each said wheel assembly comprises a substantially vertical axis.

13. A vehicle having a swivel drive system, said vehicle comprising:
a plurality of drive modules, wherein each said drive module includes
a plurality of wheel assemblies mounted for rotation relative to an axis of said drive module, with each said wheel assembly being separately rotatable relative to a respective axis of said wheel assembly, and with each said wheel assembly including a rotatable wheel with the rolling orientation of said wheel being altered by said rotation of each said wheel assembly about its own axis;
wherein simultaneous rotation of said wheel assemblies relative to said axis of said drive module and rotation of each said wheel assembly about its own axis generates a driving force, and wherein each said drive module further includes a rotatable carrier with the respective said wheel assemblies of each said drive module being joined with said carrier, and wherein said carrier is driven for rotation about said axis of said drive module whereby rotation of said carrier causes said wheel assemblies to rotate about the axis of said drive module, and wherein each said wheel assembly is rotated about its own axis at one-half the rate of rotation of said wheel assemblies about said axis of said drive module.

14. The vehicle of claim 13, wherein each said drive module further includes a synchronizing member engaged with the respective said wheel assemblies whereby movement of said synchronizing member simultaneously rotates said wheel assemblies about the respective axis of each said wheel assembly.

15. The vehicle of claim 14, wherein each said drive module further includes a synchronizing input, said synchronizing input engaging with said synchronizing member to impart rotation to said synchronizing member.

16. The vehicle of claim 14, wherein said wheel assemblies include a geared portion and said synchronizing members comprise ring gears, with said geared portions of said wheel assemblies of each said wheel module being in engagement with the respective said synchronizing member.

17. The vehicle of claim 13, wherein said vehicle comprises a human operated vehicle or a robot.

18. A swivel drive system, said swivel drive system comprising:
a drive module, said drive module including
a plurality of wheel assemblies mounted for rotation relative to an axis of said drive module, with each said wheel assembly being separately rotatable relative to a respective axis of said wheel assembly;
wherein simultaneous rotation of said wheel assemblies relative to said axis of said drive module and rotation of each said wheel assembly about its own axis generates a driving force;
said drive module further including a cam member, and wherein each said wheel assembly includes a cam follower, with said cam followers being rotated into contact with said cam when said wheel assemblies are rotated relative to said axis of said drive module to rotate said wheel assemblies about the respective axis of each said wheel assembly.

19. The swivel drive system of claim 18, said drive module further including a synchronizing member engaged with said wheel assemblies whereby movement of said synchronizing member simultaneously rotates said wheel assemblies about the respective axis of each said wheel assembly.

20. The swivel drive system of claim 19, wherein said wheel assemblies are mounted to a rotatable carrier, wherein rotation of said carrier causes said wheel assemblies to rotate about an axis of said drive module.

* * * * *